United States Patent
Choi et al.

(10) Patent No.: US 9,178,928 B2
(45) Date of Patent: *Nov. 3, 2015

(54) SCALABLE CONTENT STREAMING SYSTEM WITH SERVER-SIDE ARCHIVING

(71) Applicant: EdgeCast Networks, Inc., Santa Monica, CA (US)

(72) Inventors: Seungyeob Choi, Northridge, CA (US); Alexander A. Kazerani, Santa Monica, CA (US)

(73) Assignee: EDGECAST NETWORKS, INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,470

(22) Filed: May 19, 2014

(65) Prior Publication Data

US 2014/0258240 A1    Sep. 11, 2014

Related U.S. Application Data

(63) Continuation of application No. 12/953,346, filed on Nov. 23, 2010, now Pat. No. 8,738,736.

(51) Int. Cl.
  *G06F 15/16* (2006.01)
  *H04L 29/06* (2006.01)
  *H04L 29/08* (2006.01)
  *G06F 17/30* (2006.01)

(52) U.S. Cl.
  CPC ........ *H04L 65/607* (2013.01); *G06F 17/30073* (2013.01); *H04L 65/4069* (2013.01); *H04L 67/1029* (2013.01)

(58) Field of Classification Search
  CPC .............. H04L 65/607; H04L 65/4084; H04L 67/1002; H04L 65/4069; H04L 67/2842; H04L 29/08729; H04L 41/509; H04L 65/60; H04L 67/1012; H04L 67/2847; H04L 67/2852; H04L 67/325; H04N 21/47202; H04N 21/02
  USPC .................. 709/219, 213, 226, 231; 707/661
  See application file for complete search history.

(56) References Cited

U.S. PATENT DOCUMENTS

| | | | |
|---|---|---|---|
| 6,108,703 | A | 8/2000 | Leighton et al. |
| 6,272,598 | B1 | 8/2001 | Arlitt et al. |
| 6,415,368 | B1 | 7/2002 | Glance et al. |
| 6,553,413 | B1 | 4/2003 | Leighton et al. |
| 7,103,645 | B2 | 9/2006 | Leighton et al. |
| 7,149,797 | B1 * | 12/2006 | Weller et al. ................. 709/223 |
| 2002/0143888 | A1 * | 10/2002 | Lisiecki et al. .............. 709/214 |
| 2003/0115421 | A1 | 6/2003 | McHenry et al. |

(Continued)

*Primary Examiner* — Dustin Nguyen
*Assistant Examiner* — Hao Nguyen

(57) ABSTRACT

Some embodiments provide a scalable content streaming system that performs server-side archiving. The content streaming system includes a set of streaming server clusters, a remote storage server, and a set of distributed servers. Each streaming server cluster includes at least one streaming server and a local storage server. Each streaming server of a particular cluster distributes a content stream that is uploaded to the streaming server while also recording the content stream to the local storage server of that particular cluster. The remote storage server stores files from the local storage servers that are transferred when recording to those files is complete. The set of distributed servers distribute a live stream of content from a particular streaming server when the content is being uploaded to the particular streaming server and distribute a recorded stream of the content from the remote storage server when the upload is complete.

18 Claims, 8 Drawing Sheets

(56) References Cited

U.S. PATENT DOCUMENTS

| | | |
|---|---|---|
| 2004/0030837 A1 | 2/2004 | Geiner et al. |
| 2004/0088412 A1 | 5/2004 | John et al. |
| 2005/0262245 A1 | 11/2005 | Menon et al. |
| 2006/0075279 A1* | 4/2006 | Cameros et al. ............ 714/4 |
| 2006/0168147 A1* | 7/2006 | Inoue et al. ............ 709/219 |
| 2008/0086484 A1 | 4/2008 | Darnell et al. |
| 2008/0198705 A1* | 8/2008 | Takahashi ............ 369/7 |
| 2009/0276476 A1* | 11/2009 | Jolly ............ 707/204 |
| 2010/0250773 A1* | 9/2010 | Mao ............ 709/231 |
| 2012/0072525 A1* | 3/2012 | Yevmenkin et al. ............ 709/213 |
| 2013/0304864 A1* | 11/2013 | Cadwell et al. ............ 709/218 |

\* cited by examiner

SCALABLE CONTENT STREAMING SYSTEM WITH SERVER-SIDE ARCHIVING

CLAIM OF BENEFIT TO RELATED APPLICATIONS

This application is a continuation of U.S. nonprovisional application Ser. No. 12/953,346 entitled "Scalable Content Streaming System with Server-Side Archiving", filed Nov. 23, 2010. The contents of application Ser. No. 12/953,346 are hereby incorporated by reference.

TECHNICAL FIELD

The present invention relates to systems and methods for providing server-side archiving for streaming content.

BACKGROUND ART

With continued deployments of higher speed data networks and new devices that leverage such data networks, content providers are extending beyond static content to offer streaming content over these data networks. Streaming content includes live streaming whereby content is distributed to end users as it is being published by a content provider. Live streaming includes audio and video streams of live events such as sporting events, news, etc. Streaming content can also include previously broadcast or recorded events such as television programming, movies, music, and other such multimedia content that is available on-demand to end users.

Server-side archiving is a process of recording a live stream so that the stream can subsequently be accessed on-demand. Server-side archiving provides convenience to the content provider as the content provider publishes the content stream once for the dual purpose of making the content stream available for live distribution to end users and for recoding the content stream for subsequent on-demand access.

FIG. 1 illustrates a prior art process for performing server-side archiving. The figure includes a content provider 110, streaming server 120, storage server 130, and end user 140. The content provider 110 publishes a content stream 115 to the streaming server 120. The streaming server 120 distributes the stream 115 to multiple end users including the end user 140. End users include any user with a network connected device such as smartphone, tablet, laptop, or other computing machine.

While the content is being streamed to the streaming server 120, the streaming server 120 performs server-side archiving. Specifically, the streaming server 120 records the stream 115 as a file on the storage of the storage server 130. Once the live stream is complete, end users can access the stream 115 on-demand by requesting that the storage server 130 stream the content that was recorded to the file. The storage server 130 and the streaming server 120 may be separate servers or a single server.

In many instances, content providers do not host or distribute their own streams because of the costs associated with doing so. Specifically, a content provider will need sufficient bandwidth to stream live and on-demand content to hundreds or thousands of end users. Additionally, the content provider will need sufficient storage resources to store the on-demand content. Many content providers therefore turn to a content streaming system for the live and on-demand distribution of their content streams.

The content streaming system provides an infrastructure with sufficient bandwidth, storage, and other resources to distribute large amounts of content to large quantities of end users. However, within the content streaming system, server-side archiving becomes a complex issue.

FIG. 2 illustrates one prior art approach to server-side archiving within a content streaming system 205. As shown, the content streaming system 205 includes an ingest cluster 210, storage server 240, and a set of edge servers 250. The ingest cluster 210 includes a load balancer 215 and streaming servers 220 and 230. Each streaming server 220 and 230 includes an internal storage 235.

In FIG. 2, the load balancer 215 distributes the content providers 260 and 270 across the ingest cluster 210 such that the content provider 260 publishes content to the streaming server 220 and the content provider 270 publishes content to the streaming server 230. The published content is distributed from the streaming servers 220 and 230 to multiple end users using the set of edge servers 250. Additionally, the published content is recorded to a file that is stored on the internal storage 235 of the streaming server to which the content is being streamed.

Once a content provider stops publishing content to a particular streaming server, the particular streaming server transfers the recorded file from the internal storage 235 to the storage server 240. The set of edge servers 250 can then distribute the content on-demand to end users by accessing the recorded file on the storage server 240.

A problem occurs in the content streaming system 205 when a content provider is disconnected from the streaming server and the content provider reconnects to resume a live stream. As shown in FIG. 3, when the content provider 310 initially connects to the content streaming system 305, the load balancer 315 forwards the content provider 310 to a first streaming server 320 of the ingest cluster 330. The content provider 310 begins publishing a live stream to the first streaming server 320 and the first streaming server 320 records the live stream to a file on its local storage 335.

During the live stream, the content provider may be disconnected from the first streaming server 320 due to a network error (e.g., network congestion) or because the content provider 310 choose to interrupt, pause, or stop the live stream. When the content provider 310 reconnects to the ingest cluster 330 in order to resume the live stream, the load balancer 315 may forward the content provider 310 to a second streaming server 325 of the ingest cluster 330. The content provider 310 resumes publishing the remainder of the live stream to the second streaming server 325 and the second streaming server 325 records the latter portion of the live stream to a file on its local storage 345. As a result, the live stream becomes segmented into two separate files.

When the files are transferred to the storage server 340, one file may overwrite the other file such that the available on-demand content stream is incomplete. Alternatively, the storage server 340 may retain both files. However, when an end user request for the content stream arrives at the storage server 340, the request will specify a single file and not each of the at least two segmented files. This is because the content provider provides the end user with the link to the on-demand content. The content provider assumes that its streamed content was recorded and stored as a single file on the storage server 340 and the content provider is therefore unaware of the file segmentation.

To remedy the file segmentation issue, the storage server 340 can perform transcoding to combine the segmented files into one file. However, the resources needed to perform such transcoding can degrade the overall system performance. Transcoding is a resource intensive process that takes several minutes or hours for the storage server 340 to complete. When transcoding, many of the storage server's resources are used to perform the transcoding instead of servicing on-demand requests. Moreover, transcoding may not be possible when the content provider publishes a content stream that is encoded using an encoder that is not supported by or unknown to the storage server 340.

Accordingly, there is a need for a content streaming system that performs live distribution of content and server-side archiving for multiple content providers and end users. There is a need for such a system to perform server-side archiving in a manner that does not degrade overall system performance and does not subject the system to the issues of file segmentation and transcoding. Furthermore, there is a need for scalability within the content streaming system such that the system can perform live distribution and server-side archiving for any number of content providers, end users, live streams, and on-demand streams.

SUMMARY OF THE INVENTION

Some embodiments provide a scalable content streaming system that performs server-side archiving. The content streaming system is scalable to support any number of end users, content providers, live content streams, and on-demand content streams without system performance degradation. The content streaming system includes a set of ingest clusters, a remote storage cluster, and a set of distributed edge servers.

Each ingest cluster includes one or more streaming servers, an optional load balancer, and a local cluster storage that is shared by the streaming servers of the same ingest cluster. A content provider publishes its stream to a streaming server of a particular ingest cluster. The streaming server provides live distribution of the stream being published to the edge servers while also recording the stream to a file that is stored on the local cluster storage of the particular ingest cluster. Each streaming server in a particular ingest cluster is provided with a Network File System (NFS) mount to the storage of the local cluster storage of that particular ingest cluster. As a result, the streaming servers of an ingest cluster have shared access to the local cluster storage for that ingest cluster. The shared access enables the streaming servers to append to files that were generated by other streaming servers of that particular ingest cluster. By providing the capability to append to previously generated files, the streaming servers can continue archiving a stream that was interrupted and resumed to the same file on the storage of the local cluster storage. In this manner, the content streaming system of some embodiments avoids the issues that arise from segmented files while also providing a scalable content streaming system.

The local cluster storage periodically runs a process to identify files for which recording has ceased for a specified duration. Any such identified files are transferred from the local cluster storage to the remote storage cluster. The remote storage cluster provides on-demand access to content of the transferred files.

BRIEF DESCRIPTION OF THE DRAWINGS

In order to achieve a better understanding of the nature of the present invention, a preferred embodiment of the scalable content streaming system will now be described, by way of example only, with reference to the accompanying drawings in which.

DETAILED DESCRIPTION

In the following detailed description, numerous details, examples, and embodiments of a scalable content streaming system that performs server-side archiving are set forth and described. It will be clear and apparent to one skilled in the art that the content streaming system is not limited to the embodiments set forth and that the content steaming system may be practiced without some of the specific details and examples discussed.

I. Overview

Some embodiments provide a scalable content streaming system that performs server-side archiving. The system is scalable to support any number of end users, content providers, live content streams, and on-demand content streams without system performance degradation. The content streaming system will be described relative to a Content Delivery Network (CDN). However, it should be apparent to one of ordinary skill in the art that the content streaming system of some embodiments is adaptable to a "cloud" service provider or other provider of streaming content. The term server (e.g., streaming server, storage server, and edge server), as used herein, includes (i) an independent physical computing machine or device with a processor, memory, storage, and network connectivity and (ii) a virtual machine that runs in conjunction with other virtual machines on a single or distributed set of physical computing machines or devices, wherein each virtual machine is provided exclusive or shared access to a particular set of computing resources (e.g., processor, memory, storage, etc.) of the physical computing machines or devices.

Figure 4:
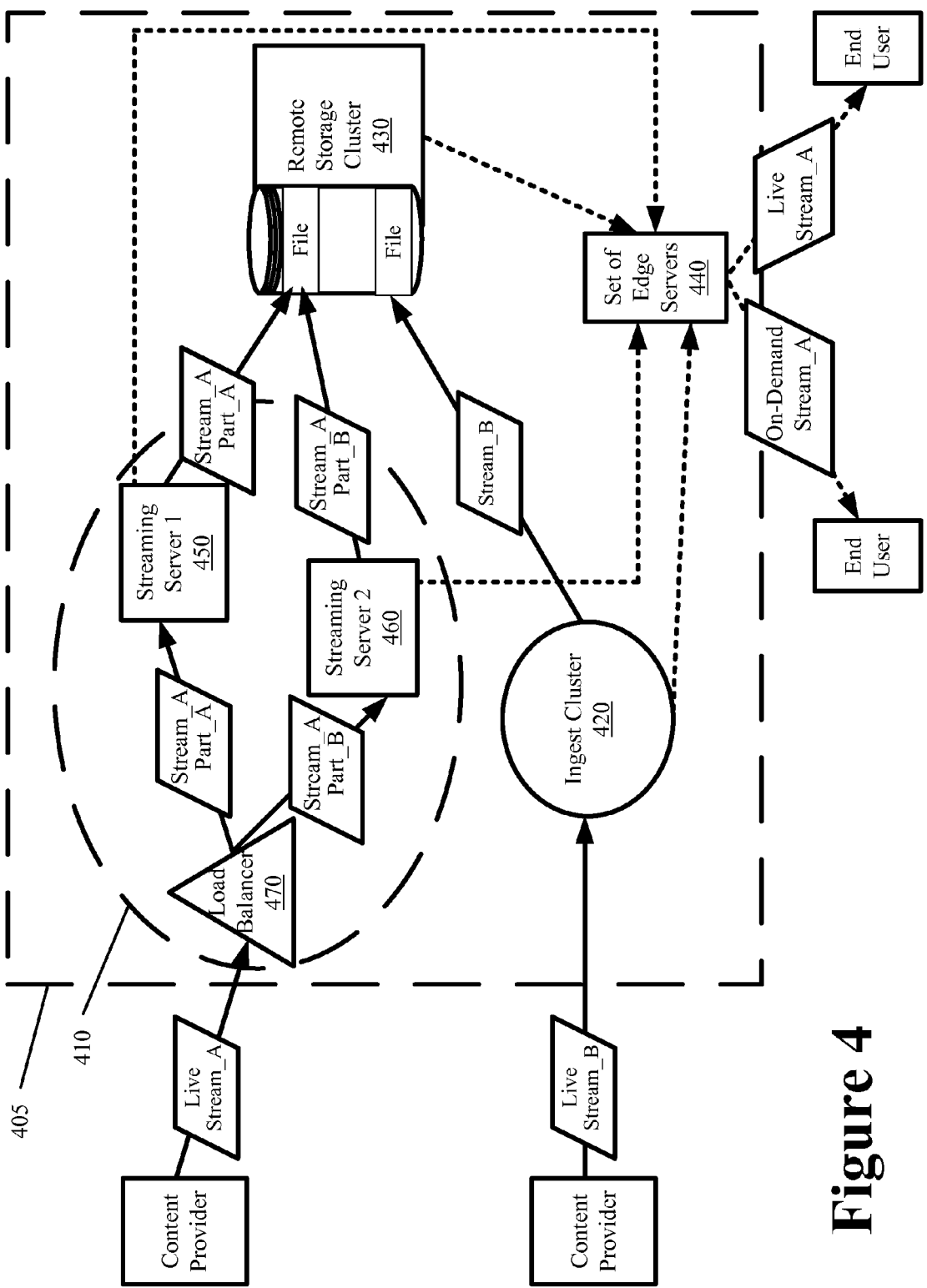
FIG. 4 presents a content streaming system that performs server-side archiving in accordance with some embodiments.

FIG. 4 presents a content streaming system 405 that performs server-side archiving in accordance with some embodiments. The content streaming system 405 includes a set of ingest clusters (e.g., ingest clusters 410 and 420), a remote storage cluster 430, and a set of distributed edge servers 440.

Each ingest cluster 410 or 420 includes one or more streaming servers. As shown, ingest cluster 410 includes two streaming servers 450 and 460. Each particular ingest cluster 410 or 420 may optionally include one or more load balancers to selectively distribute the content streams across the streaming servers of the particular cluster. In this figure, ingest cluster 410 includes load balancer 470. In some embodiments, the set of ingest clusters are distributed across multiple regions with each ingest cluster 410 or 420 optimally servicing a particular region. For example, the ingest cluster 410 may be located in California and the ingest cluster 420 may be located in New York. Content providers on the west coast are assigned to publish content to the ingest cluster 410 so that the content being published is subject to less latency, jitter, and other network errors than when publishing the content across the country.

Figure 1:
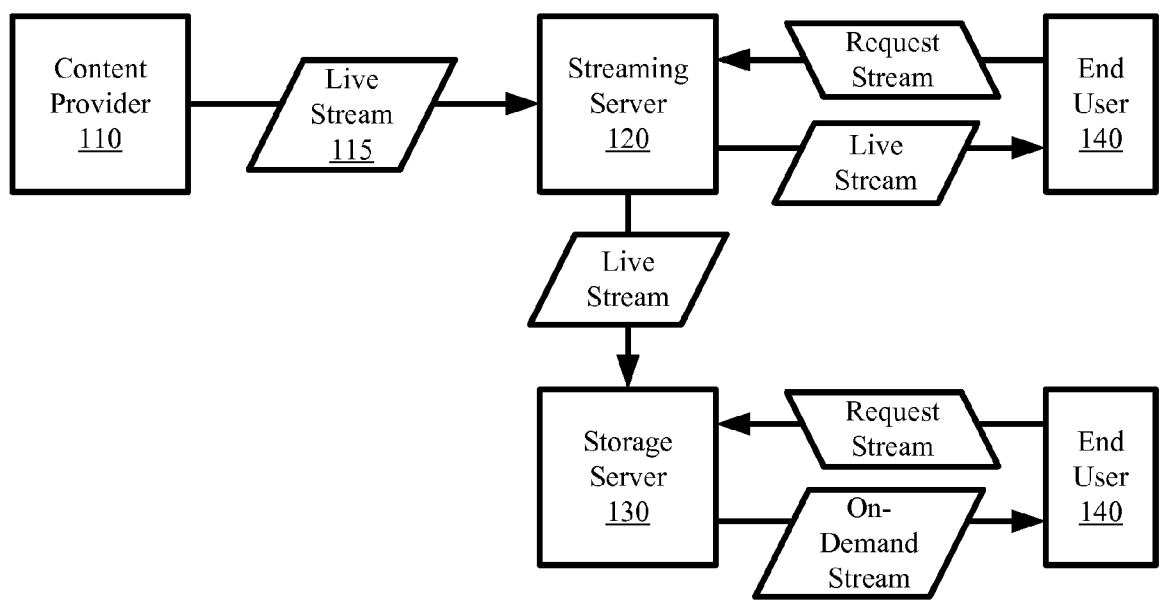
FIG. 1 illustrates a prior art process for performing server-side archiving.
Figure 2:
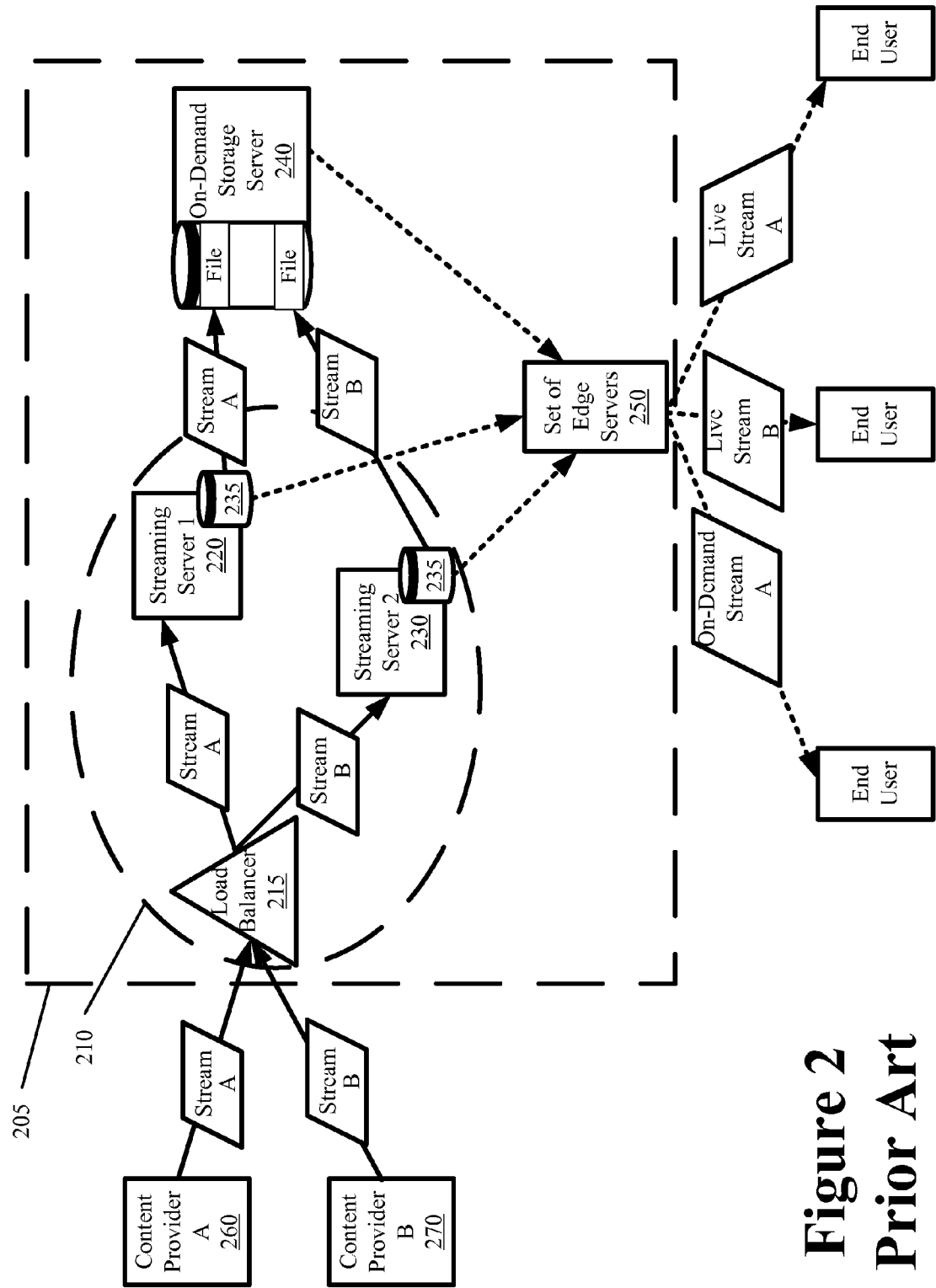
FIG. 2 illustrates one prior art approach to server-side archiving within a content streaming system.
Figure 3:
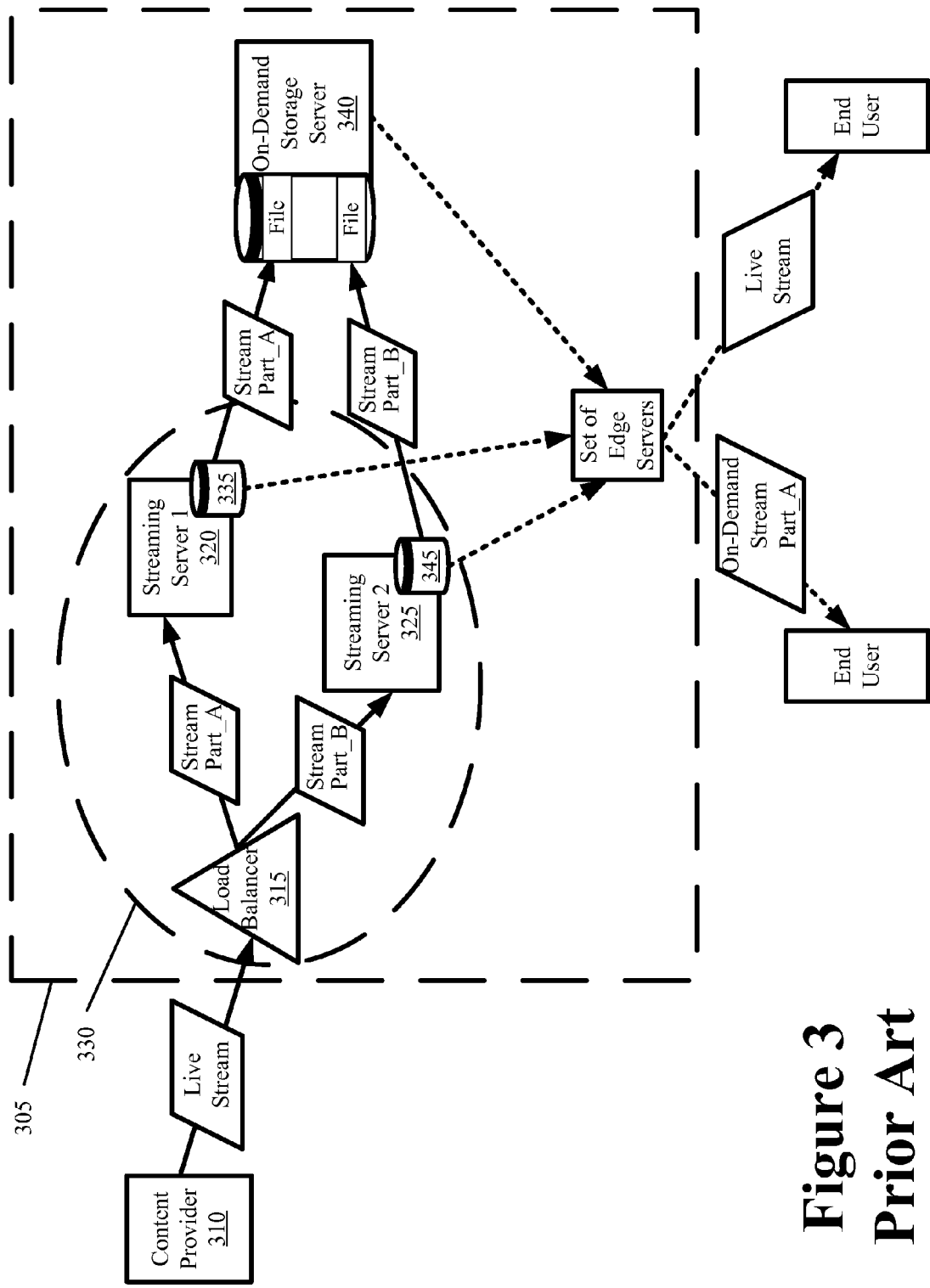
FIG. 3 illustrates problems that occur within a content streaming system when performing server-side archiving and a content provider is temporarily disconnected from a streaming server and the content provider reconnects to resume a live stream.

As in FIG. 2, content providers publish their content streams to at least one streaming server of a particular ingest cluster. The streaming server notifies the set of edge servers 440 as to the content that it has available for streaming. The set of edge servers 440 distribute the content streams from the streaming server to requesting end users. The set of edge servers 440 includes one or more edge servers that are placed at specific locations within various geographic regions. The specific locations include high traffic locations of the Internet (e.g., primary Internet exchange points) or other data networks. Each region may cover one or more municipalities, cities, states, countries, or areas.

In contrast to the content streaming system 205, the streaming servers of the content streaming system 405 do not require local storage for recording the content providers' live streams. Instead, when performing server-side archiving, the streaming servers record the content streams to files on the storage of the remote storage cluster 430. To do so, each streaming server of the content streaming system 405 is provided with a Network File System (NFS) mount to the storage of the remote storage cluster 430. The NFS mount provides each streaming server with shared access to the storage on the remote storage cluster 430. This shared access allows each streaming server to generate new files of the remote storage cluster 430 in addition to accessing files that are generated by other streaming servers on the remote storage cluster 430. Therefore, when a publishing interruption occurs that disconnects a content provider from a first streaming server and the content provider is forwarded to a second streaming server upon reconnection, the second streaming server uses the NFS mount to determine whether a file has already been generated on the remote storage cluster 430 for the content provider's stream. When such a file is identified, the second streaming server accesses the file and appends the remainder of the content provider's live stream to that file. In this manner, the content streaming system 405 is not subject to file segmentation and the system 405 can therefore avoid transcoding recorded files. In some embodiments, the second streaming server can be configured to delete or overwrite the existing file with a new file.

In some embodiments, the remote storage cluster 430 includes one or more storage servers with magnetic disk storage, optical storage, other forms of non-volatile storage (e.g., solid state drive storage), and/or volatile storage. In some other embodiments, the remote storage cluster 430 is a logical disk that is composed of an array of storage servers that each provide physical storage for the logical disk. The storage servers of the remote storage cluster 430 may be distributed across multiple regions or may be grouped at a particular location. The NFS mounts may provide the streaming servers with access to the entire storage, a partition, or a set of folders of the remote storage cluster 430.

The content streaming system 405 of FIG. 4 can be scaled by increasing the number of streaming servers, edge servers, and storage of the remote storage cluster. By increasing the number of streaming servers, the system 405 is able to support a greater number of live streams. By increasing the number of edge servers, the system 405 is able to distribute the live and on-demand content streams to larger quantities of end users. By increasing the storage of the remote storage cluster, the system 405 is able to store more on-demand content and store such content for longer durations.

However, the scalability of the content streaming system 405 of FIG. 4 is limited because of the overhead that is associated with supporting large numbers of NFS mounts. Managing an NFS mount over a remote server is a resource intensive operation that could cause bottlenecks to form at the streaming servers (e.g., 450 or 460) or at the remote storage cluster 430 of the content streaming system 405. Specifically, each NFS mount requires the streaming server to maintain at least a buffer cache and TCP/IP configuration for that NFS mount. For a large number of NFS mounts, the resulting overhead consumes resources of the streaming server that could otherwise be allocated to publishing and distributing content streams. Accordingly, bottlenecks may occur at the streaming servers when the streaming servers manage large number of NFS mounts.

Bottlenecks may also occur at the remote storage cluster 430. As the number of streaming servers increases and the number of supported content providers increases, the number of NFS mounts to the remote storage cluster 430 increases. This can result in performance degradation at the remote storage cluster 430 when several streaming servers attempt to simultaneously record different streams to different files on the remote storage cluster 430. For example, each of fifty streaming servers may receive a different live stream from a different content provider. Each of the fifty streaming servers will then attempt to record their received stream as a separate file on the remote storage cluster 430. Consequently, the remote storage cluster 430 simultaneously receives fifty different write access requests to the shared storage. In such a case, the remote storage cluster may be unable to provide sufficient write access to each of the streaming servers due to bandwidth limitations or disk limitations. Consequently, some streaming servers will be unable to archive the live streams.

Figure 5:
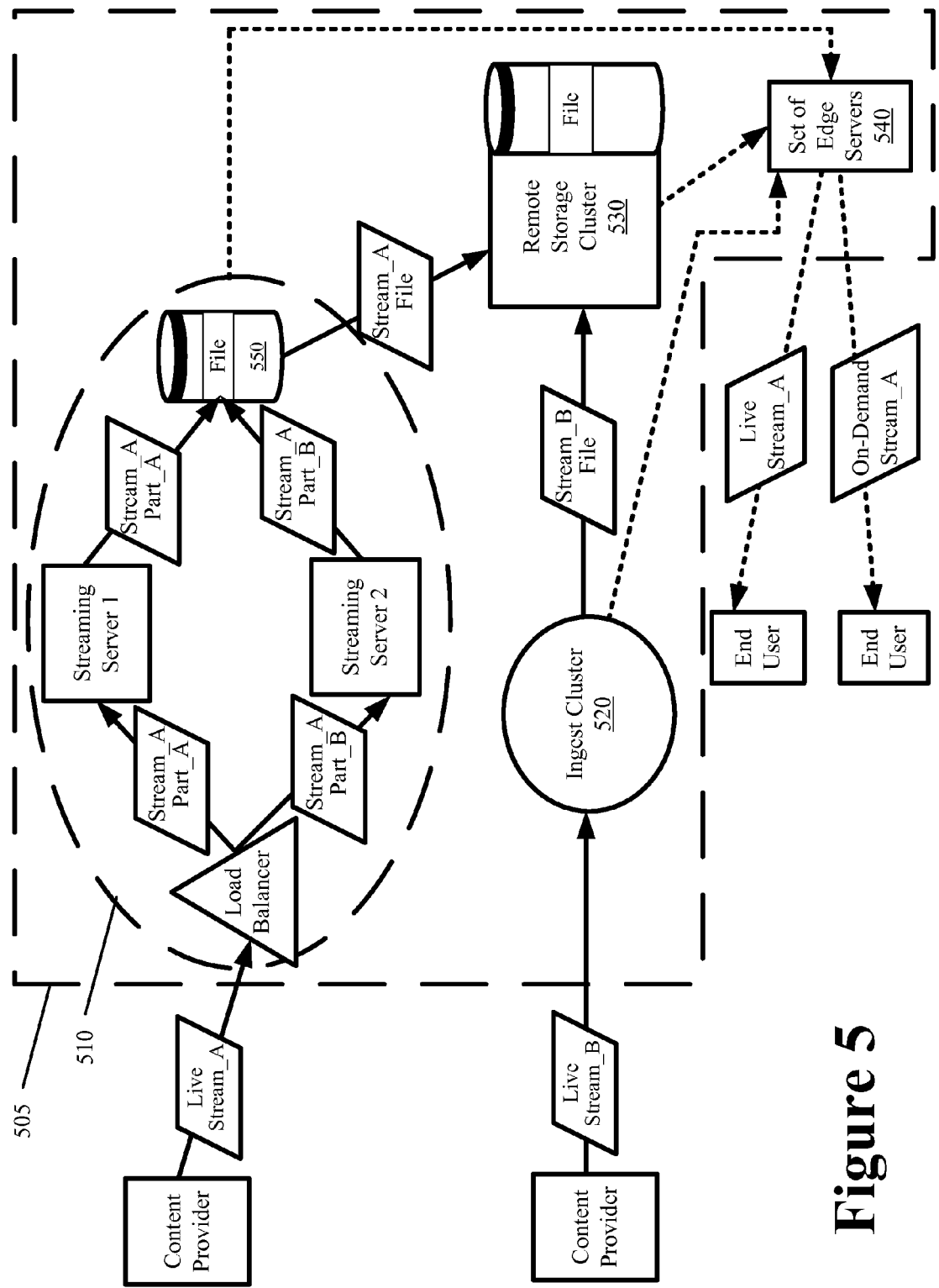
FIG. 5 presents a scalable content streaming system that performs server-side archiving in accordance with some embodiments.

Accordingly, some embodiments enhance the content streaming system 405 of FIG. 4 such that it is not subject to performance degradation, bottlenecks, or NFS mount overhead as the system is scaled. FIG. 5 presents one such scalable content streaming system in accordance with some embodiments. As in the FIG. 4 above, the content streaming system 505 of FIG. 5 includes ingest cluster 510, ingest cluster 520, remote storage cluster 530, and a set of distributed edge servers 540. In this figure, each ingest cluster 510 and 520 is modified to include a local cluster storage. As shown, ingest cluster 510 includes local cluster storage 550. The content streaming system 505 can be scaled to include any number of ingest clusters.

In some embodiments, the local cluster storage is a storage server or a logical disk that is comprised of an array of storage servers. The local cluster storage is located in proximity to the other components that are included in the same ingest cluster as the local cluster storage. The local cluster storage provides shared storage for the streaming servers that are of the same ingest cluster as the local storage. In this figure, local cluster storage 550 provides shared storage access to the streaming servers of the ingest cluster 510. To provide the shared access, the streaming servers of a particular ingest cluster are each provided with an NFS mount to the storage of the local cluster storage for that particular ingest cluster.

The operation of each streaming server is modified such that each streaming server within a particular ingest cluster records a live stream to a file on the local cluster storage of that particular ingest cluster and not to the storage of the remote storage cluster 530. In so doing, the potential for bottleneck at the streaming servers and the remote storage cluster 530 is minimized or altogether eliminated. Specifically, the overhead for managing the remote NFS mount to the remote storage cluster 530 is eliminated. Instead, the streaming servers manage a localized NFS mount to the local cluster storage which requires fewer resources and less overhead. Also, performance is improved as the streaming servers are subject to lower latency and better throughput when performing server-side archiving. In some embodiments, the introduction of the local cluster storage also reduces the number of NFS mounts that the streaming servers of a particular cluster manage. In some such embodiments, the streaming servers of system 505 support fewer NFS mounts as a particular set of content providers are permitted to publish to the streaming servers of a given cluster. Consequently, the streaming servers manage NFS mounts for those content providers without incurring overhead in managing NFS mounts for other content providers that are assigned to publish content to other ingest clusters.

The introduction of the local cluster storage also reduces or eliminates the NFS mount overhead at the remote storage cluster 530. Specifically, each local cluster storage manages the NFS mounts for the streaming servers of the same ingest cluster as the local cluster storage. The remote storage cluster 530 may allocate a single NFS mount for the local cluster storage of each ingest cluster in order to allow recorded files of streaming content to be transferred to the remote storage cluster 530. Alternatively, this transfer can be performed without NFS mounts between the remote storage cluster 530 and the local cluster storages. In some embodiments, a local cluster storage uses a network protocol, such as File Transfer Protocol (FTP), to transfer recorded files to the remote storage cluster 530.

By recording the live streams as files on the local cluster storage instead of the remote storage cluster, the content streaming system of some embodiments localizes traffic for generating the on-demand files intra-cluster. The streaming servers and the local cluster storage of a particular cluster are geographically close to one another relative to the remote storage cluster. This proximity allows the streaming servers to record a live stream to a file on the local cluster storage with less latency, less jitter, and less packet loss than when recording the file to a remote storage cluster.

Moreover, the content streaming system 505 continues to avoid the issues of file segmentation and transcoding as a content provider that was disconnected from a streaming server of a particular ingest cluster can resume the disconnected stream with any other streaming server of that particular ingest cluster. In some embodiments, a content provider has access to a particular ingest cluster using a URL that is provided to the content provider when the content provider registers with the content streaming system. This URL resolves to a virtual Internet Protocol (IP) address for the load balancer of the particular ingest cluster or an IP address of a streaming server of the particular ingest cluster.

The local cluster storage periodically runs a process to identify files that have not been recorded to for a specified duration. Any such identified files are transferred from the local cluster storage to the remote storage cluster where they are made available for on-demand access.

II. Operation

A. Streaming Server

The streaming servers serve as the ingest point through which content providers publish their content streams to the content streaming system. In some embodiments, the content streams are published for purposes of live distribution to end users (i.e., live streaming) and/or server-side archiving whereby the content streams are recorded as they are published so that the streams can subsequently be made available for on-demand access. Accordingly, the streaming servers facilitate server-side archiving within the content streaming system.

Figure 6:
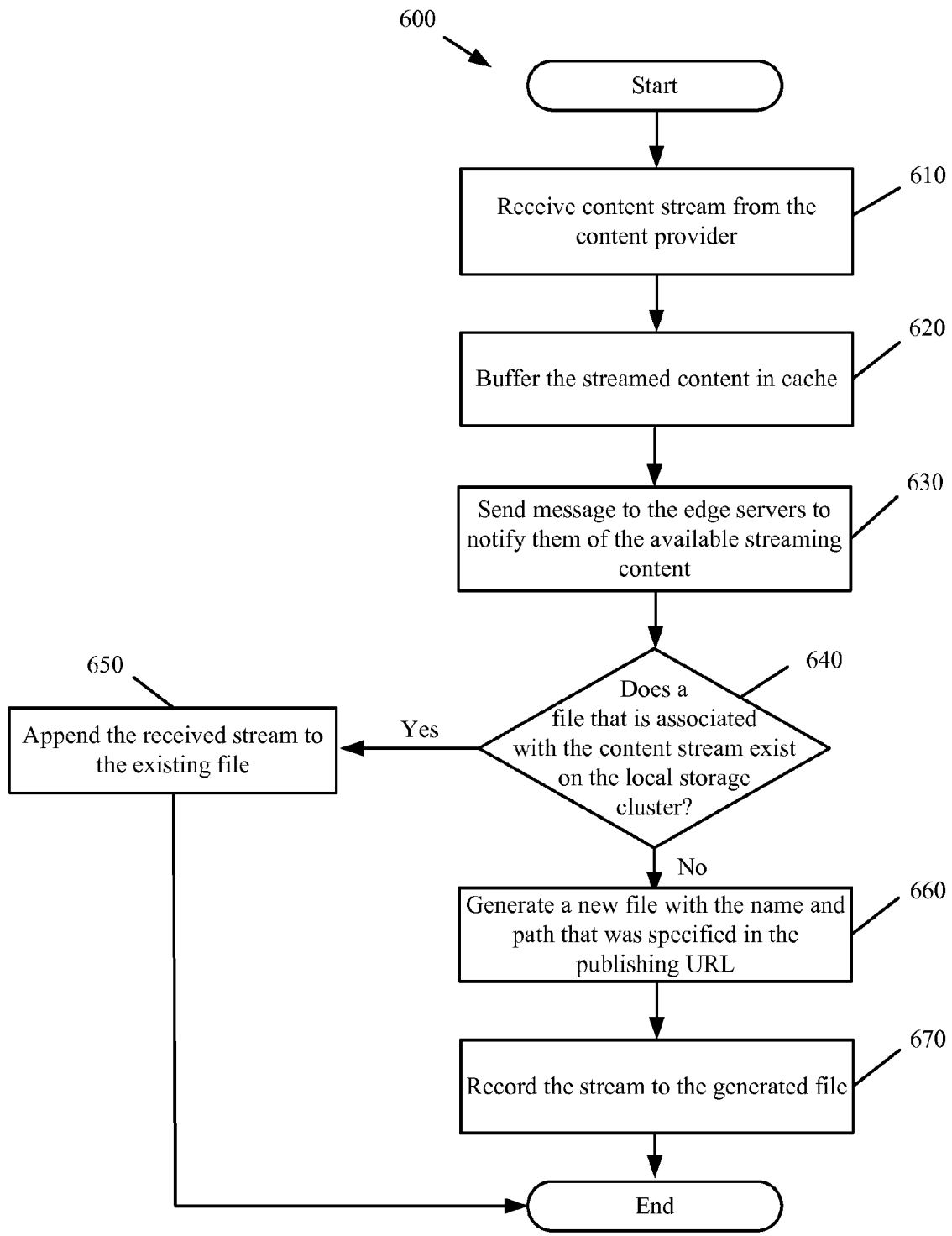
FIG. 6 presents a process performed by a streaming server to facilitate server-side archiving in accordance with some embodiments.

FIG. 6 presents a process 600 performed by a particular streaming server of the contents streaming system to facilitate server-side archiving in accordance with some embodiments. The process 600 begins when a content provider publishes a content stream to a URL that is associated with an ingest cluster that includes the particular streaming server. In some embodiments, each content provider is provided with a URL that allows the content provider to publish content streams to a particular ingest cluster. The URL is provided to the content provider when the content provider registers with the content streaming system. In some embodiments, the URL includes a domain name, account number, stream name, and authentication token. For example, the URL may be specified as "ingestcluster1.cdn.com/123456/streamName.isml?token".

In some embodiments, the domain name resolves to an ingest cluster that optimally services the content provider. This may include an ingest cluster of the content streaming system that is geographically closest to the content provider or an ingest cluster that is located nearest to a majority of end users that request the content provider's content. In some embodiments, the domain name resolves to a virtual IP address of the load balancer for the specified ingest cluster. In some other embodiments, the domain name resolves to an IP address of one or more specific streaming servers of the ingest cluster. In the example above, the domain name specifies the "ingestcluster1.cdn.com" ingest cluster.

The account number (e.g., 123456) identifies the content provider to the content streaming system and can be used for monitoring purposes. The account number is assigned to the content provider when the content provider registers with the content streaming system.

The stream name identifies the content stream that is to be published to the content streaming system. The stream name may include a directory path for specifying where to store the content stream file for on-demand access. The stream name may also include other parameters for specifying an encoding, bitrate, etc. of the content stream.

In some embodiments, the authentication token is provided to the content provider at the time of registration. The authentication token is used to authenticate the identity of the content provider and to prevent unauthorized access to the content streaming system by others attempting to use the content provider's account information.

The process 600 receives (at 610) the content stream from the content provider. The content stream may be encoded using any one of several encoding codecs. For example, the content stream may be encoded using H.264 or Moving Picture Experts Group (MPEG) encoding. In some embodiments, the content provider publishes different encodings of the same content stream at different quality settings (e.g., different compression levels) to the streaming server. The content provider optionally provides a manifest file to identify the different encodings and to facilitate adaptive streaming of the different encodings.

The process caches (at 620) the streamed content to provide buffering when redistributing the stream to the edge servers. The stream may be cached to the memory of the streaming server including volatile memory such as Random Access Memory (RAM) or non-volatile memory such as magnetic disk storage.

The process makes the content stream available to the edge servers by sending (at 630) one or more messages to the edge servers. The messages identify which content is currently being streamed to or is available for streaming at the particular streaming server. The messages may include the IP address or hostname of the streaming server and one or more content stream names that are being streamed to or are available for streaming at the particular streaming server. In some embodiments, the messages are sent once the content provider begins publishing the content stream to the particular streaming server. The messages may also be periodically sent (e.g., every minute) to update the edge servers of the available streaming content. In some embodiments, the messages may include unicast, multicast, or broadcast messages. The edge servers use these messages to obtain and stream content from the appropriate streaming server to end users.

To archive the stream, the process determines (at 640) whether a file that is associated with the received content stream exists on the storage of the local cluster storage. In some embodiments, the process determines whether a file on the storage has the same name as the file name that is specified within the publishing URL. As noted above, the streaming server is provided access to the storage of the local cluster storage using an NFS mount. A script or system command may be executed on the streaming server to determine whether the file exists on the local cluster storage.

In some embodiments, when the file is determined to exist on the local cluster storage, the process appends (at 650) the received stream to the existing file. However, it should be apparent to one of ordinary skill that the streaming servers may be configured to delete the existing file and generate a new file to which the streaming content is recorded. When the file is determined to not exist on the local cluster storage, the process generates (at 660) a new file on the NFS mounted storage with the name and path that was specified in the publishing URL. The process then records (at 670) the received stream to the generated file. The process continues writing to the file until the stream is terminated and the process ends.

While the live stream is being published, the process processes requests from the edge servers. When the streaming server receives a request to stream content to one or more edge servers, the process locates and streams the requested content to the requesting edge servers. In some embodiments, the content stream request from an edge server specifies a particular stream name that was identified from the messages sent at 630, a particular interval of content, a particular content bitrate or encoding, or other parameters. The streamed content can be dynamically adjusted to provide a higher or lower bitrate as conditions change when streaming the content.

B. Local Cluster Storage

As earlier noted, the local cluster storage is a storage server or a logical disk that is comprised of multiple storage servers. The local cluster storage within each ingest cluster provides localized shared storage to eliminate file segmentation when performing server-side archiving. Moreover, the local cluster storage within the ingest cluster localizes the traffic that is passed between the streaming servers and the local cluster storage of a given ingest cluster when recording a content stream. In so doing, the streaming servers are able to record the streaming content to the local cluster storage more efficiently than when recording the same content to a remote storage cluster. This is because the recording occurs with lower latency, less jitter, and fewer overall network errors as the content streams are recorded to the local cluster storage of the ingest cluster instead of a more remote storage server (i.e., remote storage cluster of the content streaming system). Furthermore, by localizing the number of mounting points and traffic to an ingest cluster, the local cluster storage for the ingest cluster is not subject to resource over usage as a result of managing large numbers of NFS mounts and servicing several simultaneous write requests. The content streaming system can thus be scaled with additional ingest clusters without degrading performance of the overall content streaming system.

Each local cluster storage runs an NFS daemon process to manage the NFS mounts and write access to the shared storage. The NFS mounts allow the streaming servers to write to the storage of the local cluster storage as if the storage was a local drive of the streaming server.

Figure 7:
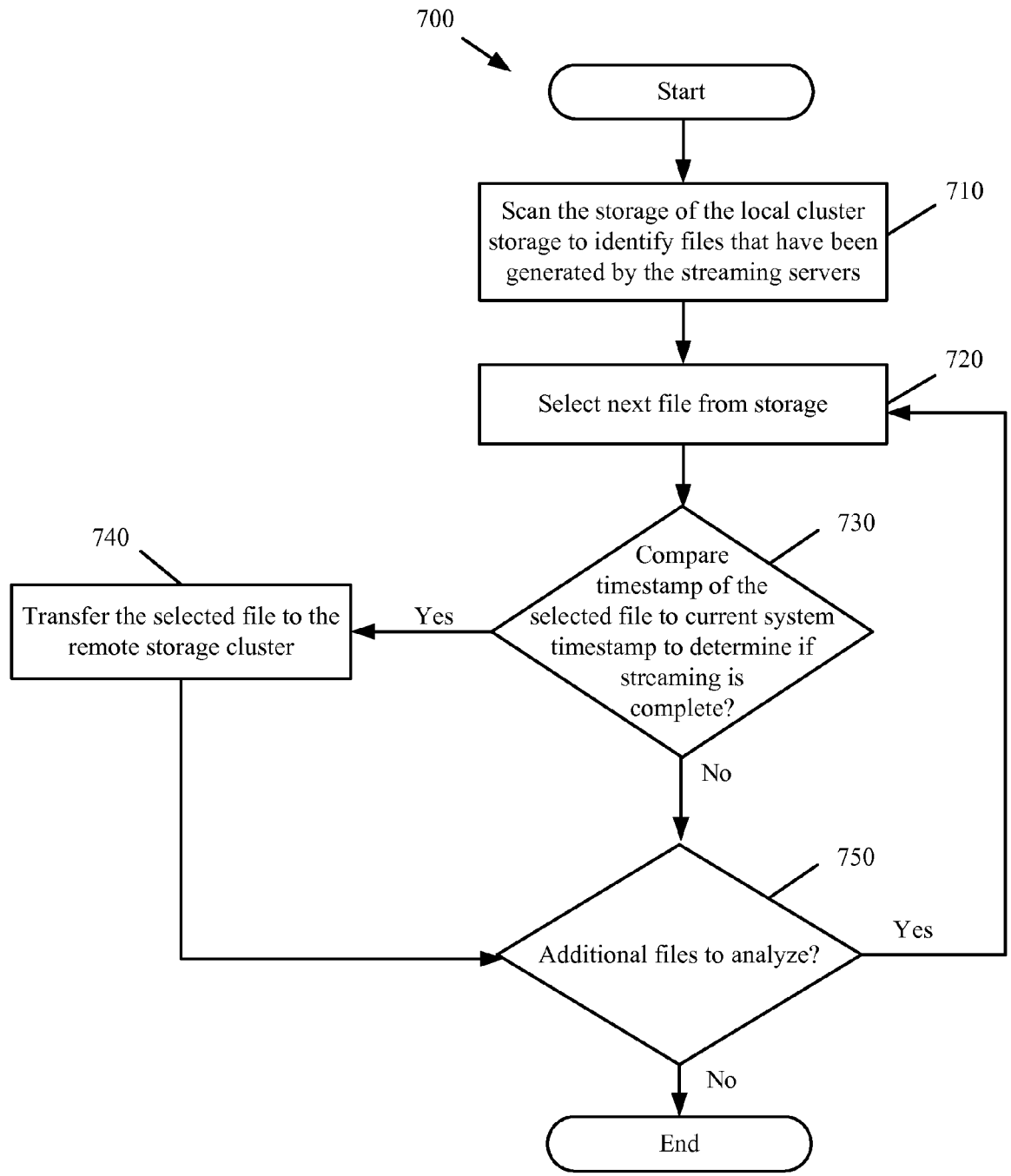
FIG. 7 presents a process performed by a local cluster storage to transfer files to the remote storage cluster in accordance with some embodiments.

Each local cluster storage is also tasked with transferring files for recorded content streams to the remote storage cluster so that the recorded streams are made available for on-demand access. In some embodiments, each local cluster storage periodically runs a script or process to transfer completed files that are no longer being recorded to the remote storage cluster. FIG. 7 presents a process 700 performed by a local cluster storage to transfer files to the remote storage cluster in accordance with some embodiments. In some embodiments, the process 700 is periodically run to identify and transfer completed files.

The process begins by scanning (at 710) the storage of the local cluster storage to identify files that have been generated by the streaming servers. The process selects (at 720) a file from the storage. The process compares (at 730) a timestamp for the selected file to a current system timestamp to determine whether recording to the file is incomplete or complete.

Recording to a file is incomplete when the timestamp for the selected file matches the current system timestamp. Matching timestamps indicate that the file is currently being written to. Recording to a file is also incomplete when the timestamp for the selected file is offset from the current system timestamp by less than a specified duration. In this case, the content provider is provided an opportunity up to the specified duration to resume the stream and continue appending to the file. In some embodiments, the specified duration is configured by the content provider or by a content streaming system administrator. The duration may be configured when the content provider registers with the content streaming system or when the content provider begins publishing a stream by specifying the duration as a query string argument in the URL used to publish the stream to the content streaming system. When the selected file is identified to be incomplete, the process determines (at 750) whether there are other files to analyze. When other files remain, the process returns to step 720. Otherwise, the process ends.

Recording to a file is complete when the timestamp for the file is offset from the current system timestamp by the specified duration. This indicates that the file has not been written to since the timestamp of the file and the content provider has had sufficient opportunity within the specified duration to resume the stream and he did not. Therefore, the streaming event that is associated with the selected file has ended and the process transfers (at 740) the selected file to the remote storage cluster. In some embodiments, the local cluster storage is configured with information (e.g., IP address, communication protocol, etc.) to communicably couple with the remote storage cluster in order to transfer the file. In transferring the file to the remote storage cluster, the process may provide the remote storage cluster with parameters that are associated with the file. For example, the process passes parameters to specify how long the file should be available for on-demand access before deletion from the remote storage cluster. In some embodiments, these parameters are provided by the content provider using the publishing URL or are set by the content provider when registering with the content streaming system. The process then determines (at 750) whether there are other files to analyze. When other files remain, the process returns to step 720. Otherwise, the process ends.

The process 700 causes files to be transferred to the remote storage cluster shortly after the streaming to the files is complete. In so doing, content streams are quickly and automatically made available for on-demand access without action by the content provider or end users. This is in contrast to other content streaming systems where content is transcoded, pieced together, manually transferred, or again streamed so that it can be stored to an on-demand server.

It should be apparent to one of ordinary skill in the art that other parameters may be used in addition to or instead of the file timestamp to determine whether streaming to a file is complete or not. For example, the process can compare a previous size of a selected file with its current size to determine whether the selected file has been appended to. If the file size has changed, then the file is still being appended to and the file is not yet complete.

C. Remote Storage Cluster

In some embodiments, the remote storage cluster of the content streaming system may be a storage server, multiple storage servers, or a logical disk that is comprised of multiple storage servers. The storage servers of the remote storage cluster may be distributed across multiple regions or may be located at particular location. The remote storage cluster stores on-demand content for distribution by the edge servers.

In some embodiments, the remote storage cluster notifies the edge servers as to the files that have been transferred to the remote storage cluster. In some such embodiments, the remote storage cluster sends a message to the edge servers of the content streaming system. As in step 630 of process 600, this message notifies the edge servers as to what recorded content streams are available at the remote storage cluster. Therefore, when an edge server receives an end user request for a particular content stream, the edge server can determine whether the content stream is available on-demand from the remote storage cluster. If so, the edge server submits a request for the particular content stream to the remote storage cluster to initiate the on-demand streaming of the particular content stream to the end user. In some other embodiments, the remote storage cluster does not provide any notification to the edge servers and the edge servers forward all on-demand requests to the remote storage cluster.

In some embodiments, a content provider specifies which remote storage server of the remote storage cluster their content is transferred to for on-demand access. In this manner, the content provider can optimize the on-demand distribution of its content. For example, the content streaming system may have a remote storage server in Los Angeles and another in Paris. When the content provider provides French programming, it is likely that most of the end users that request the on-demand content will be located throughout France. Therefore, the content is best distributed (e.g., lowest latency, fewest number of hops, lowest network/bandwidth costs, etc.) from the remote storage server in Paris.

In some embodiments, the content provider specifies which remote storage server to have its content transferred to using a set of configuration parameters that the content provider sets during registration with the content streaming system. These configuration parameters can then be associated with the content provider's account number that is provided to the content streaming system through the publishing URL. In some other embodiments, the content provider specifies which remote storage server by inserting various parameters into the URL that is used when publishing content to the content streaming system. For example, the URL "ingestcluster1.cdn.com/123456"00/stream.swf" identifies a specific remote storage server to transfer content to for on-demand access using the "?00" parameter that follows the account number. In this example, each two digit value specifies a different remote storage server. The configuration parameter is maintained within the ingest cluster until the upload of the content provider stream is complete at which point the local cluster storage uses the parameter to identify which remote storage server to transfer the file to.

In some embodiments, content providers are provided additional parameters to customize the storage and access to their on-demand content streams within the content streaming system. In some embodiments, the content providers can specify the duration in which a particular content stream should be made available for on-demand access before being deleted from the remote storage server. Such a parameter can be specified at the time the content provider registers with the content streaming system. Additionally, this parameter can be specified within the URL used by the content provider to publish content to the content streaming system. Other parameters include allowing the content provider to control when a particular content stream is made available for on-demand access. For example, after a live stream of a particular event, the content provider may wish to wait 24 hours before making the particular content stream available for on-demand access.

III. Computer System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer and computing machine are meant in their broadest sense, and can include any electronic device with a processor including cellular telephones, smartphones, portable digital assistants, tablet devices, laptops, notebooks, servers, and desktop computers. Examples of computer readable media include, but are not limited to, CD-ROMs, flash drives, RAM chips, hard drives, EPROMs, etc.

Figure 8:
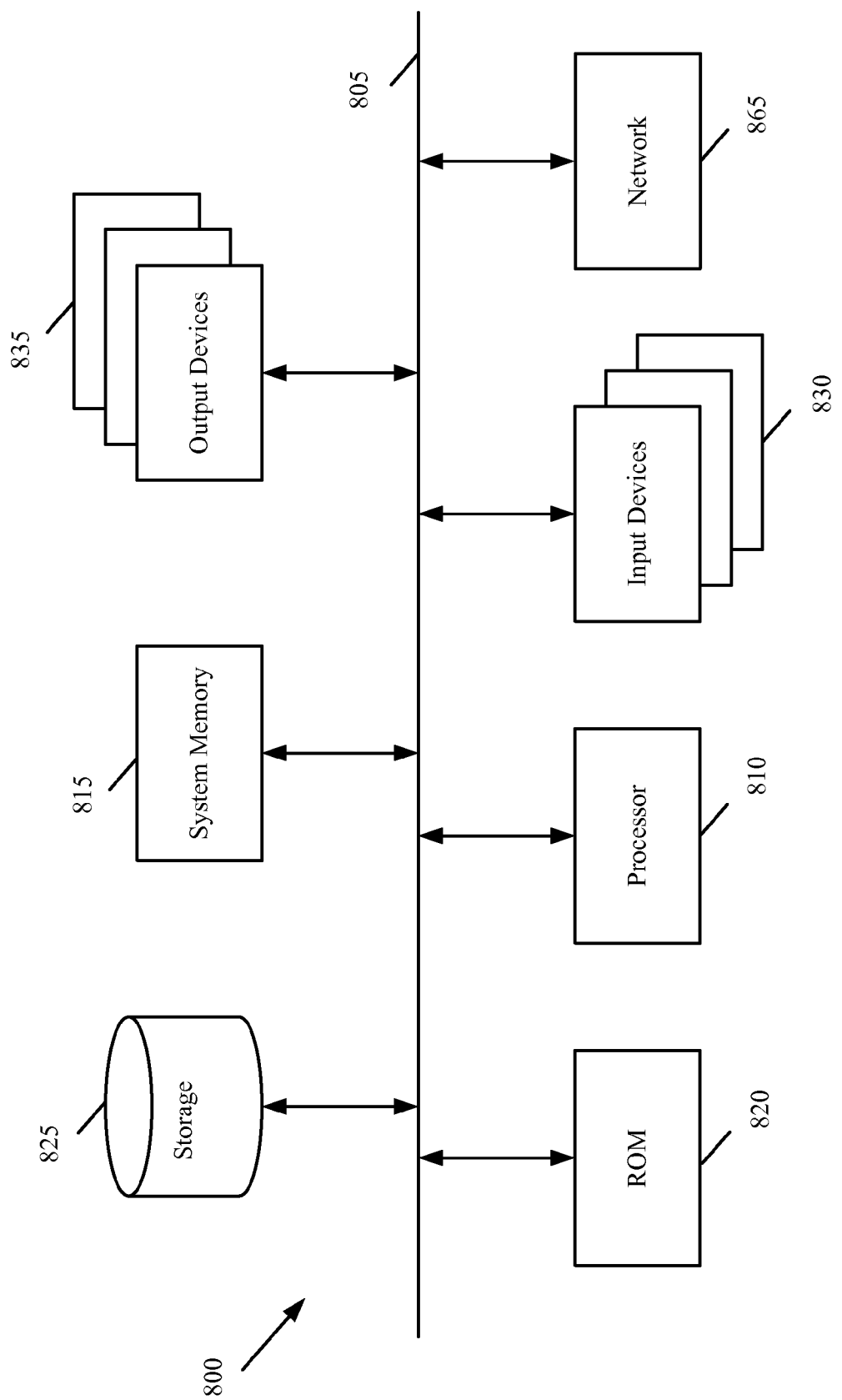
FIG. 8 illustrates a computer system or server with which some embodiments are implemented.

FIG. 8 illustrates a computer system or server with which some embodiments are implemented. Such a computer system includes various types of computer readable mediums and interfaces for various other types of computer readable mediums that implement the various processes and modules described above (e.g., the download manager application and configuration file). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet. For example, the computer 800 may be communicably coupled through the network 865 to an ingest server, mid-tier server, edge server, content provider streaming server, or end user device.

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A content streaming system comprising:
a plurality of ingest clusters, each particular ingest cluster comprising (i) a plurality of streaming servers with shared access to a first local storage, (ii) at least a first network interface with which the plurality of streaming servers receive a plurality of live content streams being actively published by any of a plurality of content providers to the particular ingest cluster, and (iii) at least a first processor encoding each live content stream as a different file on the first local storage of the particular ingest cluster;

at least one on-demand storage cluster comprising (i) a second storage, (ii) a second network interface communicably coupling the on-demand storage cluster to the plurality of ingest clusters, and (iii) a second processor archiving completed content streams from the plurality of ingest clusters by transferring to the second storage over the second network interface, any file from the first local storage of any of the plurality of ingest clusters corresponding to a live content stream that has ended for a specified duration, wherein the specified duration is configurable by a content provider of the live content stream; and a caching server comprising (i) a third network interface communicably coupling the caching server to the plurality of ingest clusters and the at least one on-demand storage cluster and (ii) a third processor responding to live content stream user requests by retrieving over the third network interface and forwarding over said third network interface, files from the first local storage of the plurality of ingest clusters and further responding to completed content user requests by retrieving over the third network interface and forwarding over said third network interface, files from the second storage of the on-demand storage cluster.

2. The content streaming system of claim 1, wherein a live content stream represents a stream a content provider continues to publish to and a completed content streams represents a stream a content provider has ceased publishing to.

3. The content streaming system of claim 1, wherein the at least one first processor from each particular ingest cluster further periodically generates and passes a first message to the caching server, said first message identifying which live content streams are available for live distribution from the corresponding particular ingest cluster.

4. The content streaming system of claim 3, wherein the second processor from the at least one on-demand storage cluster periodically generates and passes a second message to the caching server, said second message identifying which completed content streams are available for on-demand distribution from the on-demand storage cluster.

5. The content streaming system of claim 4, wherein the third processor from the caching server responds to a request for a particular live content stream by identifying from the first message of each ingest cluster, a specific ingest cluster that ingests the particular live content stream, retrieving a file encoding the particular live content stream from the specific ingest cluster, and serving the file in response to the request.

6. The content streaming system of claim 5, wherein the third processor from the caching server responds to a request for a particular completed content stream by identifying from the second message, a particular on-demand storage cluster that archives the particular completed content stream, retrieving a file encoding the particular completed content stream from the particular on-demand storage cluster, and serving the file in response to the request.

7. The content streaming system of claim 1, wherein each ingest cluster of the plurality of ingest clusters is configured to ingest live content streams originating from within a different geographic region.

8. A method for distributing live and on-demand content streams in a content streaming system comprising an ingest cluster for providing live access to live content streams, a remote storage server for providing on-demand access to completed content streams, and a plurality of distribution servers for distributing the live content streams from the ingest cluster and the completed content streams from the remote storage server to a plurality of users, the method comprising:

encoding by the ingest cluster, a live content stream being actively published by a first content provider to a first file stored on a storage shared by a plurality of ingest servers of the ingest cluster;

controlling on an individual content provider basis when a plurality of completed content streams from a plurality of different content providers become available for on-demand access, wherein said controlling comprises transferring from the ingest cluster to the remote storage server, a second file encoding a completed content stream no longer being actively published by a second content provider after a specified duration configured by the second content provider;

passing at least one message to the plurality of distribution servers, the at least one message notifying each of the distribution servers that the live content stream is available for live distribution from the ingest cluster and the completed content stream is available for on-demand distribution from the remote storage server;

distributing the live content stream with a particular distribution server of the plurality of distribution servers retrieving the first file encoding the live content stream from the ingest cluster based on said message and forwarding the first file to a requesting user; and distributing the completed content stream with a particular distribution server of the plurality of distribution servers retrieving the second file encoding the completed content stream from the remote storage server based on said message and forwarding the second file to a requesting user.

9. The method of claim 8, further comprising determining when the second content provider stops publishing to the completed content stream by any of comparing a timestamp of the second file to a current timestamp and comparing a prior file size of the second file to a current file size of the second file.

10. The method of claim 8, wherein said transferring of the second file from the ingest cluster to the remote storage server is performed without transcoding the second file encoding the completed content stream.

11. The method of claim 8, further comprising providing on-demand access to the completed content stream from the remote storage server after a condition specified by the second content provider is met, wherein the condition specifies a time delay between when live distribution of the completed content stream ends and when on-demand distribution of the completed content stream begins.

12. The method of claim 8, further comprising removing the completed content stream from the remote storage server after a condition specified by the second content provider is met, wherein the condition specifies a duration for which the completed content stream is available for on-demand distribution.

13. The method of claim 8, wherein distributing the live content stream comprises distributing the live content stream from a first distribution server of the plurality of distribution servers to a first user operating in a first geographic region and distributing the live content stream from a second distribution server of the plurality of distribution servers to a second user operating in a second different geographic region, wherein the first distribution server is optimized for content distribution to the first geographic region and the second distribution server is optimized for content distribution to the second geographic region.

14. The method of claim 8, wherein the ingest cluster is a first ingest cluster, the method further comprising publishing a second live content stream being actively published by a third content provider to a third file stored by a second ingest cluster of the content streaming system.

15. The method of claim 14, further comprising transferring the third file from the second ingest cluster to the remote storage server for on-demand distribution of the second live content stream from the remote storage server.

16. A method comprising:

establishing a first ingest cluster providing live access to a first set of live content streams that a first set of content providers operating in a first geographic region actively publish to a first set of files stored on a first shared storage used by a plurality of ingest servers of the first ingest cluster;

establishing a second ingest cluster providing live access to a second set of live content streams that a second set of content providers operating in a second geographic region actively publish to a second set of files stored on a second shared storage used by a plurality of ingest servers of the second ingest cluster;

transferring to a remote storage cluster, any file from the first set of files of the first ingest cluster no longer being actively published by a content provider and any file from the second set of files of the second ingest cluster no longer being actively published by a content provider after a specified duration configured by the content provider, the remote storage cluster providing on-demand access to a plurality of completed content streams generated as a result of said transferring; and distributing from a plurality of content distribution servers to requesting end users, the first set of live content streams from the first ingest cluster, the second set of live content streams from the second ingest cluster, and the completed content streams from the remote storage cluster, wherein said distributing comprises providing to the plurality of content distribution servers at least one message from the plurality of ingest clusters identifying the live content streams available for distribution and at least one message from the remote storage cluster identifying the completed content streams available for distribution.

17. The method of claim 16, wherein said establishing the first ingest cluster comprises configuring a shared storage for use by at least first and second ingest servers with the first ingest server generating a first file encoding a first live content stream on the shared storage and with the second ingest server generating a second file encoding a second live content stream on the shared storage.

18. The method of claim 16, wherein said establishing the first ingest cluster comprises configuring a shared storage for use by at least first and second ingest servers with the first ingest server encoding a first part of a live content stream to a particular file on the shared storage and with the second ingest server encoding a second part of the live content stream to the particular file on the shared storage.

\* \* \* \* \*